United States Patent [19]
Ohmori

[11] Patent Number: 6,126,334
[45] Date of Patent: Oct. 3, 2000

[54] CAMERA HAVING INTERCHANGEABLE OBJECTIVE LENS

[75] Inventor: Kazuyuki Ohmori, Kawasaki, Japan

[73] Assignee: Canon Kabushiki Kaisha, Tokyo, Japan

[21] Appl. No.: 09/102,239

[22] Filed: Jun. 22, 1998

[30] Foreign Application Priority Data

Jun. 27, 1997 [JP] Japan .................................. 9-186023

[51] Int. Cl.⁷ .................................................. G03B 19/12
[52] U.S. Cl. ........................... 396/354; 348/342; 348/374
[58] Field of Search .................... 348/342, 373, 348/374, 340, 341; 396/355, 429, 354

[56] References Cited

U.S. PATENT DOCUMENTS

| | | | |
|---|---|---|---|
| 4,757,387 | 7/1988 | Saito | 348/342 |
| 5,483,284 | 1/1996 | Ishiguro | 348/340 |

*Primary Examiner*—David M. Gray
*Attorney, Agent, or Firm*—Robin, Blecker & Daley

[57] ABSTRACT

An optical filter, such as a low-pass filter, which is disposed between a photo-taking lens mounted on a mount part of the camera body having an image sensor disposed on an image forming plane and a main mirror disposed within the camera body, is held in position jointly by a holding member fixed to the lower end of a front aperture part of the camera body and an elastic member fixed to the rear side of the holding member with a resilient force applied to the optical filter. In mounting the photo-taking lens on the camera body, when an end part of the photo-taking lens comes to touch the optical filter, the optical filter is allowed to temporarily move to escape from the photo-taking lens and to come back to its original position upon completion of the lens mounting operation.

11 Claims, 7 Drawing Sheets

CAMERA HAVING INTERCHANGEABLE OBJECTIVE LENS

BACKGROUND OF THE INVENTION

1. Field of the Invention

The present invention relates to a single-lens reflex type camera having a solid-state image sensor and arranged to be capable of recording information by using the solid-state image sensor and to permit use of an interchangeable photo-taking lens.

2. Description of Related Art

A number of cameras of the single-lens reflex type having a light flux obtained through a photo-taking lens used both by a viewfinder optical system for observing a photo-taking object and by an image forming system for taking a picture of the object have been developed to use a solid-state image sensor in place of a silver-halide film at an image recording part. However, if accessories used for the conventional single-lens reflex cameras, such as interchangeable lenses, external electronic flash devices, etc., are not usable for the cameras having the solid-state image sensors, it is greatly disadvantageous not only to the users of conventional single-lens reflex cameras but also to the providers of the cameras.

Accordingly, a number of cameras have been variously proposed in which, to provide a camera having a solid-state image sensor without varying the system interchangeability of single-lens reflex cameras, the solid-state image sensor is placed at a focal image forming portion corresponding to the position of the silver-halide film on the base of the conventional silver-halide-film-using single-lens reflex camera.

In the case of such a camera having a solid-state image sensor, a CCD image sensor or the like is used in general. However, such an image sensor has a spectral sensitivity characteristic which requires some correction. To meet this requirement, some optical filters are used in general. These filters include a low-pass filter which is used for avoiding a moire pattern resulting from a relation between the number of pixels of the image sensor and the high spatial frequency of the photo-taking object and for avoiding a spurious color obtained in the case of a color image sensor, and an infrared cut filter for cutting off an infrared component. As disclosed in Japanese Patent Publication No. HEI 4-435, the optical filter can be disposed in a space immediately before a shutter.

However, such a disposition of the optical filter in that space brings about the following two problems.

Firstly, unlike the conventional single-lens reflex camera, the camera of the kind having a solid-state image sensor requires no film replacing action and thus requires no back lid (back cover) arranged to be opened and closed for replacing a film. Therefore, if it is taken into consideration that the work of removing dust attached to the optical filter or replacing the optical filter with another optical filter is performed through a lens-mount opening part of the camera, the existence of a main mirror makes it very difficult to perform that working.

Secondly, since a light flux coming from a photo-taking object is split by the main mirror into light fluxes which are directed respectively toward a viewfinder system and a photo-taking system and, then, only the light flux directed to the photo-taking system passes through the optical filter, a change in optical path length caused by the optical filter takes place only in the photo-taking system. Hence, the optical path length of the viewfinder system must be made to be equal to that of the photo-taking system either by providing the viewfinder system also with an optical filter or by modifying the design of optical path length of the viewfinder or that of the total optical path length of the photo-taking system. However, such a modification not only necessitates redesign work but also results in an increase in size of the camera.

To solve the above-stated two problems, it has been considered to change the installing position of the optical filter to a position immediately before the main mirror, i.e., immediately behind the photo-taking lens.

Such a change in the installing position of the optical filter solves the above first problem to facilitate the above-stated optical filter cleaning and replacing work, because the optical filter is located immediately behind the lens-mount opening part.

As for the above second problem, since the object light flux is split by the main mirror to the viewfinder system and the photo-taking system after passing through the optical filter, the change in optical path length is equally caused by the optical filter both in the viewfinder system and the photo-taking system. Therefore, a change in the focal image forming position resulting from an increase of the optical path length due to the optical filter can be corrected by just changing the thickness of the mount.

FIG. 7 shows by way of example the arrangement of the conventional single-lens reflex type camera having a solid-state image sensor in which an optical filter is installed immediately before a main mirror. Referring to FIG. 7, a bayonet mount part 2 is provided at the front surface of a camera body 1. A photo-taking lens (not shown) is detachably mounted on the mount part 2. An optical filter 3 which is a low-pass filter or an infrared cut filter is disposed between the mount part 2 and the main mirror 4. When the user of the camera observes an object image, an object light flux coming through the photo-taking lens passes through the optical filter, so that a spectral sensitivity characteristic of the object light flux is corrected there. After the correction, a part of the object light flux is reflected upward almost at a right angle by the main mirror 4, which is a half-mirror. The reflected object light flux passes through a focusing screen 5 and a condenser lens 6 to be converted into an erecting image by a vertical and lateral inverting action of an erecting image forming element 7. The light flux of the erecting image thus obtained is led to the user through an eyepiece lens group 8. In addition, another part of the object light flux passes through the main mirror 4 and is then totally reflected by a total-reflection submirror 9. The light flux reflected by the submirror 9 is led to an automatic focusing sensor 13 through an automatic focusing optical system (10, 11 and 12) so as to detect a focusing state of the photo-taking lens.

The optical filter 3 is interposed in between a support member 14 and a fixing plate 15 to be fixed in position perpendicularly to an optical axis and not to become aslant. The support member 14 is mounted, integrally with the optical filter 3, on the camera body 1 with a screw (not shown).

In taking a shot at an object, the main mirror 4 and the submirror 9 required for the above-stated observation and focus detection are beforehand retracted from the path of the object light flux between an objective lens group of the photo-taking lens and a CCD image sensor 16 serving as a focal plane.

Next, a photo-taking light flux having passed through the objective lens group of the photo-taking lens passes through the optical filter 3 to have a spectral sensitivity characteristic thereof corrected there. When a fully-open state of shutter leading blades (front curtain) 17a is obtained, an image of the photo-taking object is formed on the CCD image sensor 16, which is mounted from the side of a back lid 18 in a focal image forming position that is about the same as the position of a silver-halide film in a single-lens reflex camera. After the CCD image sensor is exposed to the light of the object image to accumulate it for a predetermined period of time, the light flux of the photo-taking object image is cut off by a closing action of shutter trailing blades (rear curtain) 17b. After that, information on the image thus picked up is transferred to be recorded as an image signal on a storage device disposed either within the camera body or outside of the camera body.

The single-lens reflex type camera arranged to have the optical filter mounted immediately before the main mirror as described above, however, has the following problem. Since the main mirror 4 is arranged to be retracted upward at the time of an exposure, the size of a flange back part must be increased for the purpose of preventing the main mirror 4 from interfering with the optical filter 3. This increase causes an increase in size of the camera.

This problem may be solved by arranging the main mirror 4 in a smaller size to prevent the main mirror 4 from interfering with the optical filter 3.

However, in mounting a photo-taking lens on the above-stated camera having a solid-state image sensor, the base of which is the conventional single-lens reflex camera using a silver-halide film, an end part of the photo-taking lens tends to damage, or might break, the surface of the optical filter if the end part of the photo-taking lens comes to touch the optical filter. This problem still remains to be solved.

BRIEF SUMMARY OF THE INVENTION

The invention is directed to the solution of the above-stated problem. It is, therefore, an object of the invention to provide a camera having a solid-state image sensor, in which an optical filter is prevented from being damaged by a mounting or demounting operation on a photo-taking lens and is easy for maintenance work.

To attain the above object, in accordance with an aspect of the invention, there is provided a camera having a solid-state image sensor, in which an optical filter is disposed between a photo-taking lens and a main mirror and the optical filter is held by a support member which supports the optical filter and an elastic member which pushes the optical filter against the support member.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
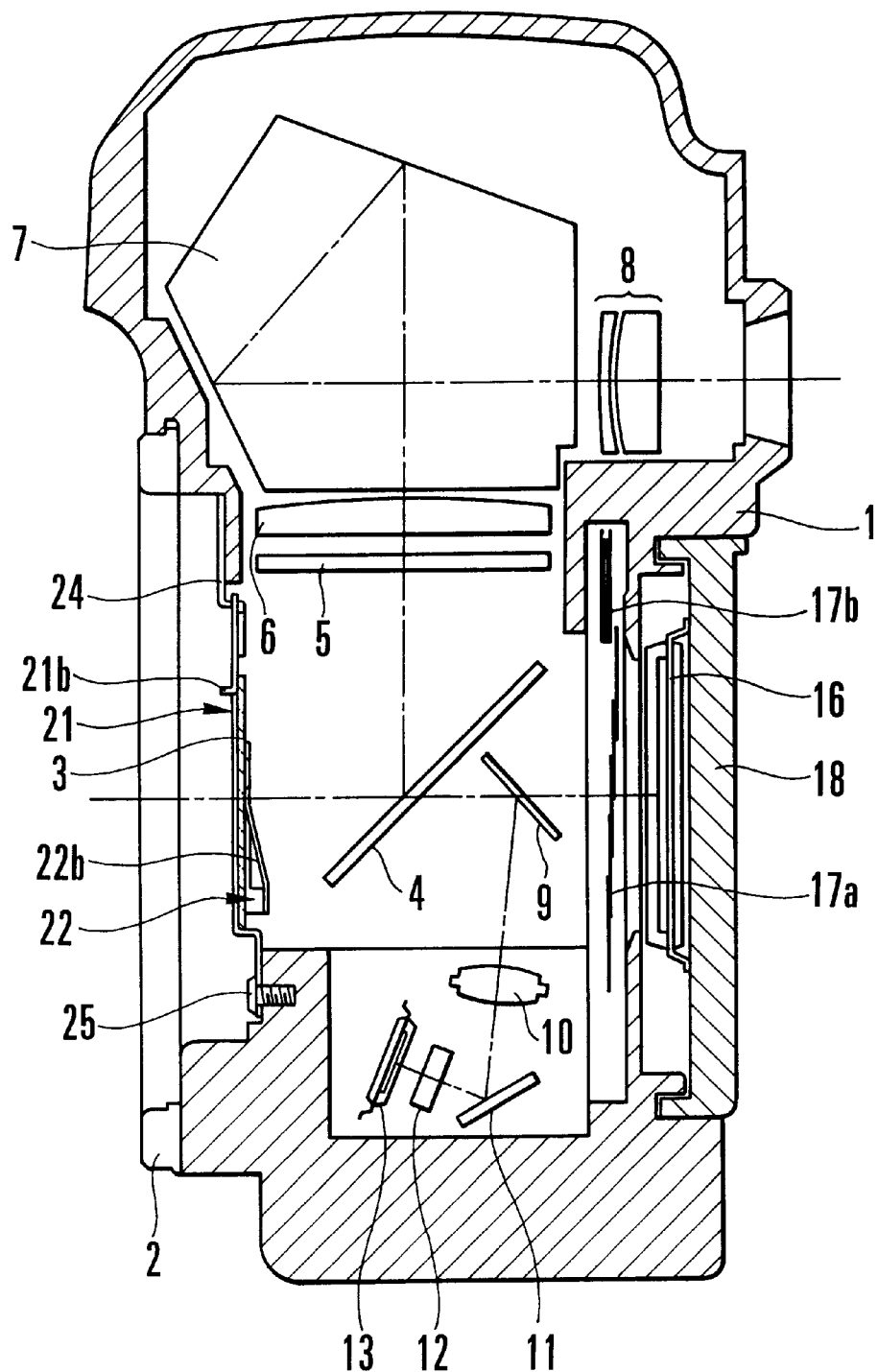
FIG. 1 is a vertical section view of a camera having a solid-state image sensor according to an embodiment of the invention.
Figure 2:
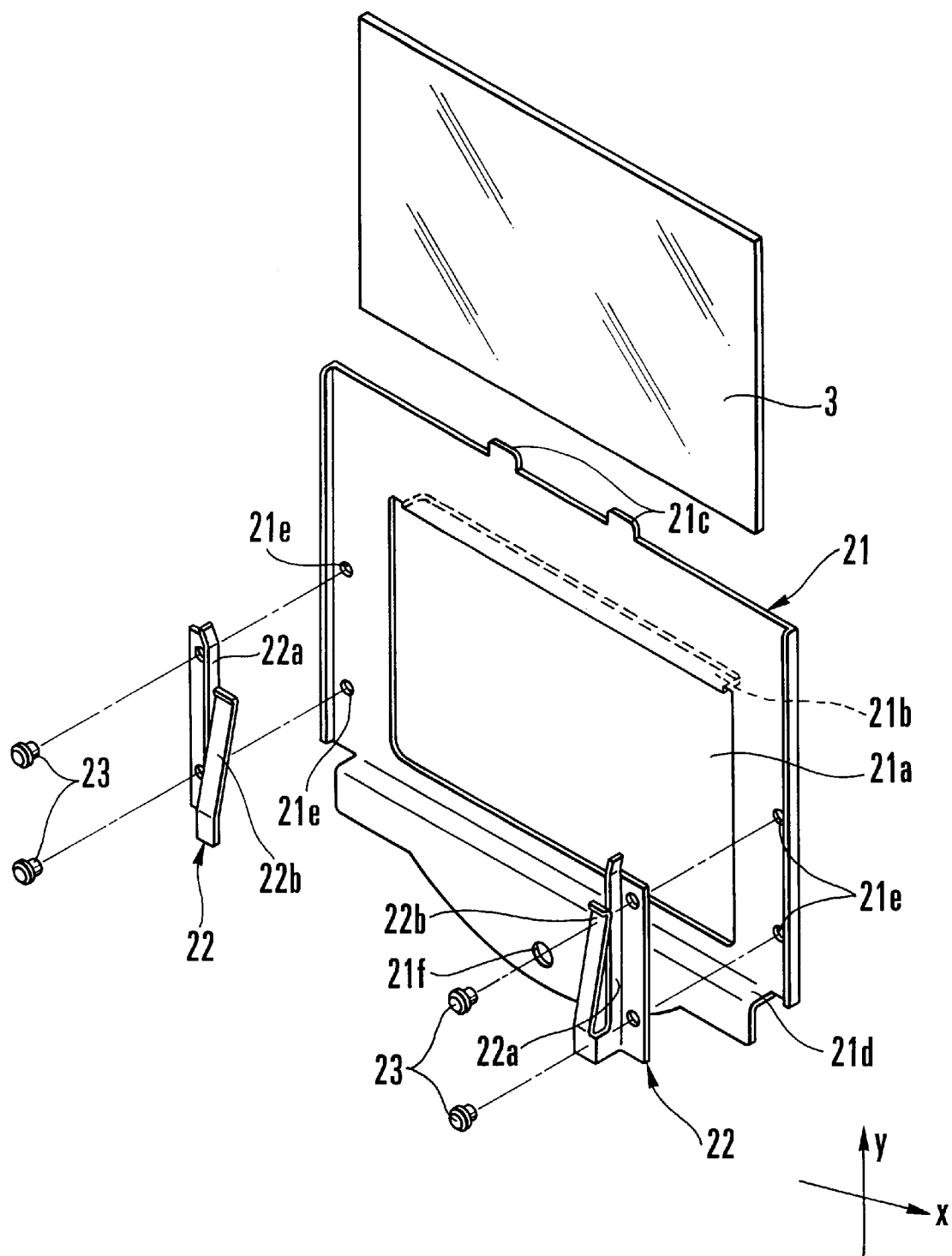
FIG. 2 is an exploded perspective view showing an optical filter unit of the camera.
Figure 3:
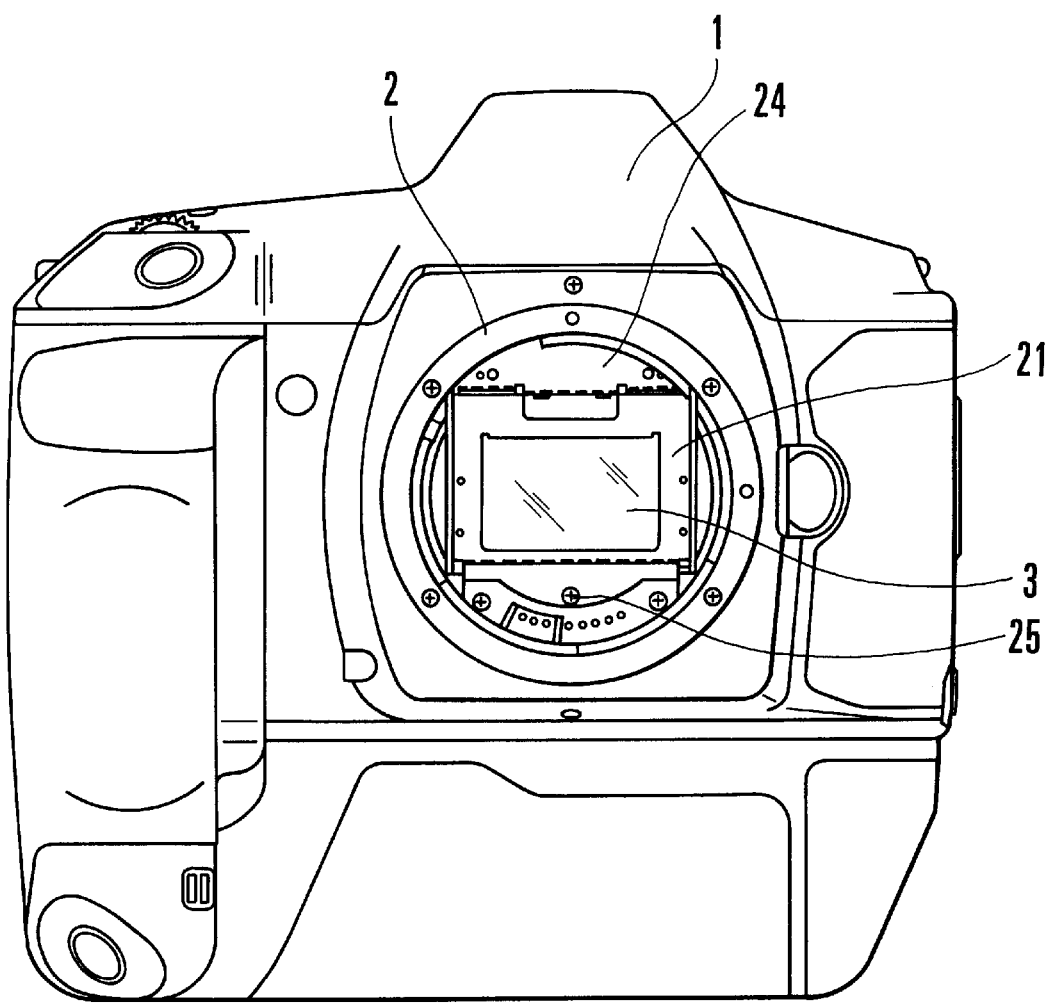
FIG. 3 is a front view of the camera with a photo-taking lens demounted.
Figure 4:
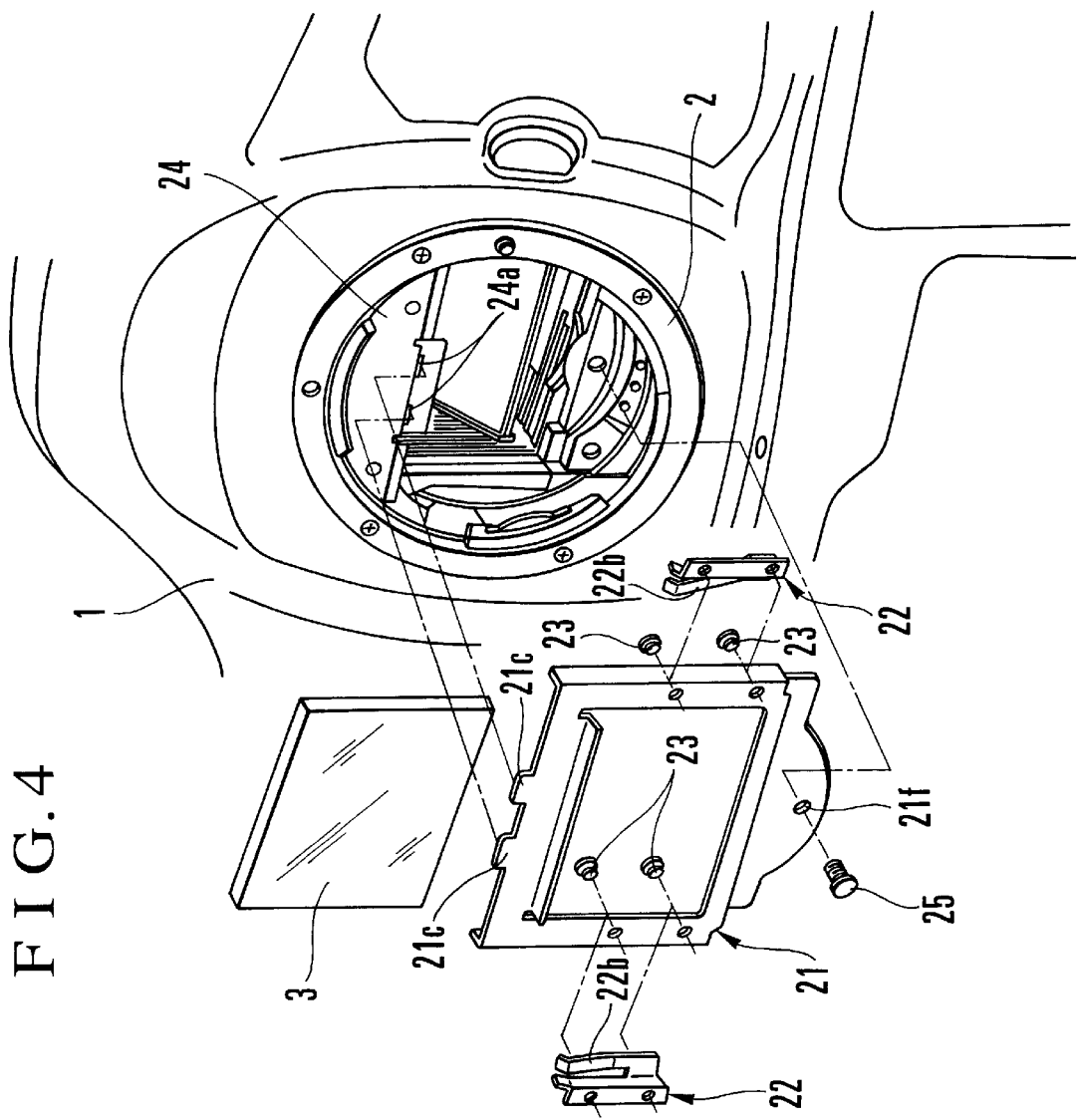
FIG. 4 is a perspective view showing the manner of fixing the optical filter unit to the camera body.

FIG. 1 is a vertical section view of a camera having a solid-state image sensor according to the embodiment of the invention. FIG. 2 is an exploded perspective view of an optical filter unit of the camera. FIG. 3 is a front view of the camera with a photo-taking lens demounted. FIG. 4 is an exploded perspective view showing the manner of fixing the optical filter unit to the camera body.

Figure 7:
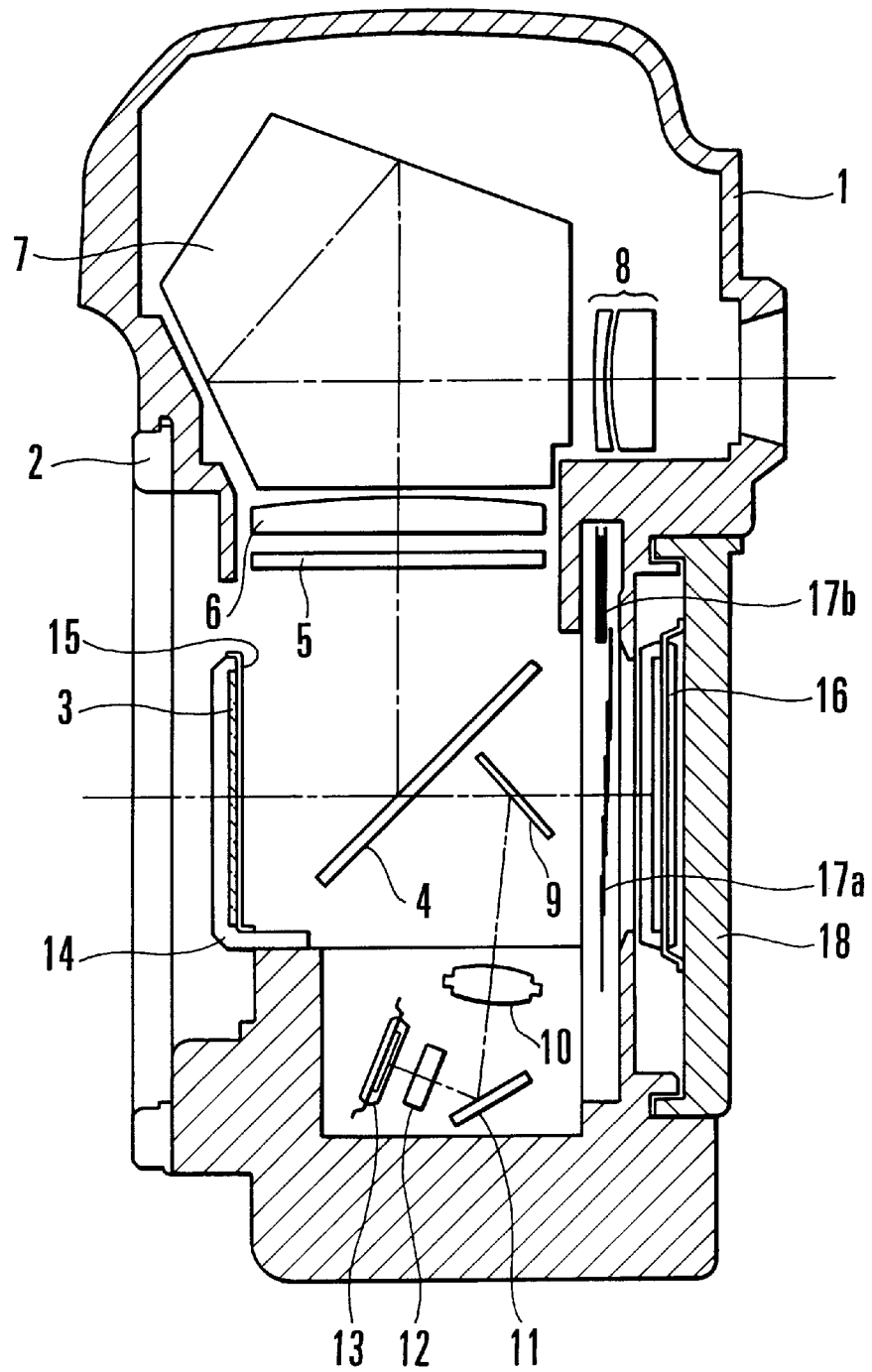
FIG. 7 is a vertical section view of the conventional camera having a solid-state image sensor.

The structural arrangement of the camera having a solid-state image sensor shown in FIG. 1 is the same as that of the conventional camera shown in FIG. 7, except for the support structure for the optical filter unit. Therefore, the parts of the camera shown in FIG. 1 which are the same as those shown in FIG. 7 are denoted by the same reference numerals as in FIG. 7, and the details of them are omitted from the following description.

Referring to FIGS. 1 and 2, a support member 21 is arranged to support an optical filter 3. The support member 21 is provided with an aperture part 21a for restricting the amount of an object light flux coming through the photo-taking lens, and a picking part 21b which is formed along the upper edge of the aperture part 21a to serve as a knob in mounting and removing the optical filter unit on and from the camera body 1. Further, the support member 21 is provided with a pair of projections 21c and an L-shaped bent part 21d, which are formed respectively on the upper and lower edges of the support member 21. Furthermore, a pair of pin holes 21e for receiving caulking pins 23 are formed in the edge part of each of two sides of the support member 21, and the L-shaped bent part 21d is provided with a hole 21f for a stop screw 25 which will be described later herein.

Referring to FIGS. 2 and 4, a pair of elastic members 22 are arranged to push the optical filter 3 against the support member 21 so as to ensure that the optical filter 3 never moves nor comes off when the camera is moved. Each of the elastic members 22 is composed of a restricting part 22a and an elastic part 22b. The restricting part 22a has two faces. One face of the restricting part 22a defines the position of the optical filter 3 in the direction of "x" on a plane orthogonally intersecting the direction of an optical axis, while the other face thereof slants outward at the upper end of the restricting part 22a. The restricting part 22a is thus arranged to guide the optical filter 3 when the optical filter 3 is inserted. The elastic part 22b exerts a resilient force to push the optical filter 3 against the support member 21. The caulking pins 23 are inserted into the pin holes 21e of the support member 21 to have the elastic member 22 secured there by caulking.

Referring to FIGS. 3 and 4, a shield member 24 is fixedly secured to the upper edge side of a front aperture part of the camera body 1. The shield member 24 has a pair of open parts 24a formed in its lower edge part to insert therein the projections 21c of the support member 21. The stop screw 25 is arranged to secure the support member 21 to the lower edge side of the front aperture part of the camera body 1 through the hole part 21f provided in the support member 21.

The optical filter unit having the above structure is assembled and fixed to the camera body 1, as described below with reference to FIGS. 2 and 4.

With the elastic member 22 in a state of having been fixed to the support member 21 with the caulking pins 23, the optical filter 3 is first slid from above in between the support member 21 and the elastic parts 22b of the elastic member 22. The optical filter 3 is thus inserted until the lower end face of the optical filter 3 abuts on the bent part 21d of the support member 21. Thus, the optical filter unit is assembled in the above manner.

Next, the projections 21c provided at the upper part of the support member 21 are inserted into the pair of open parts 24a of the shield member 24 fixed to the front aperture side of the camera body 1. Then, the optical filter unit is fixedly secured to the camera body 1 with the stop screw 25 inserted into the lower hole part 21f of the support member 21.

Figure 5:
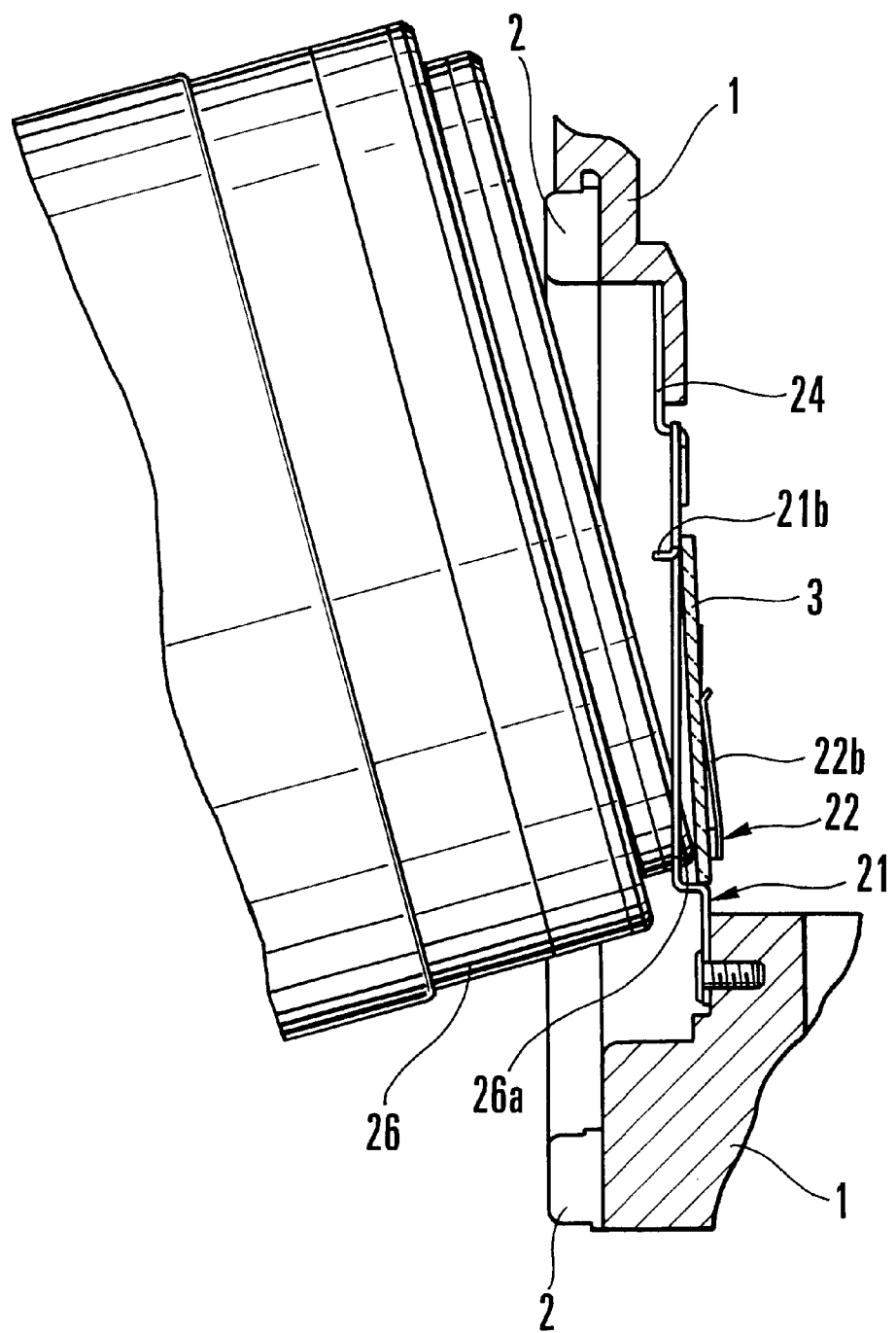
FIG. 5 is a sectional view showing essential parts of the camera during the process of mounting the photo-taking lens on the camera body.
Figure 6:
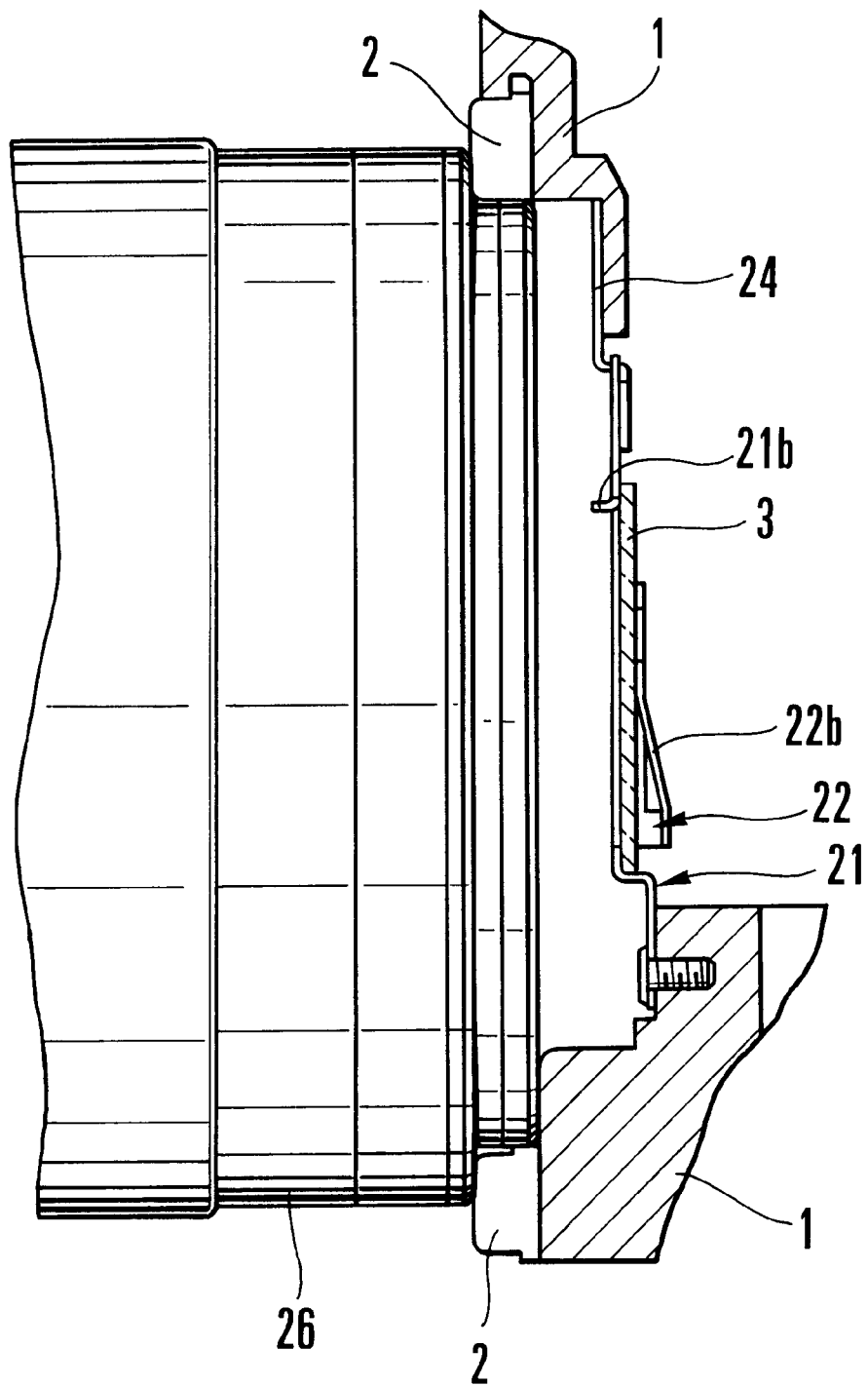
FIG. 6 is a sectional view showing essential parts of the camera at the time of completion of mounting the photo-taking lens on the camera body.

With the optical filter unit thus fixed to the camera body 1, in mounting a photo-taking lens 26 on the camera body 1 at the bayonet mount part 2, the optical filter unit acts as follows, as shown in FIGS. 5 and 6.

As shown in FIG. 5, in mounting the photo-taking lens 26 on the bayonet mount part 2, an end part 26a of the photo-taking lens 26 comes to touch the surface of the optical filter 3. Therefore, there arises some force of pushing the optical filter 3 with the photo-taking lens 26. When this pushing force comes to exceed a certain amount of force, the resilient force of the elastic part 22b of the elastic member 22, which keeps the optical filter 3 in contact with the support member 21, yields to the pushing force, so that the optical filter 3 slants as shown in FIG. 5. Accordingly, since the optical filter 3 moves in the direction of escaping from the photo-taking lens 26, the optical filter 3 is effectively saved from receiving any force that exceeds a predetermined value.

The optical filter 3 thus can be prevented from being damaged or broken by the photo-taking lens 26.

In this instance, the picking part 21b of the support member 21 is located closer to the photo-taking lens 26 than the aperture part 21a in the direction of the optical axis and serves to prevent the end part 26a of the photo-taking lens 26 from touching the upper half of the surface of the optical filter 3 which extends perpendicular to the optical axis.

Next, the end part 26a of the photo-taking lens 26 no longer touches the optical filter 3 after completion of mounting the photo-taking lens on the bayonet mount part 2. As a result, the optical filter 3 is pushed only by the resilient force of the elastic part 22b of the elastic member 22 and is thus allowed to resume its state of abutting on the support member 21, as shown in FIG. 6.

As described above, in accordance with the invention, in a camera of the kind having a solid-state image sensor and an interchangeable photo-taking lens with an optical filter disposed between the photo-taking lens and the main mirror, a fixing member for the optical filter is composed of a support member which supports the optical filter and an elastic member which causes the optical filter to abut on the support member with its elastic part. This arrangement allows the optical filter to move in the direction of escaping from the photo-taking lens when the photo-taking lens comes to touch the optical filter in mounting the photo-taking lens on the camera body. Therefore, the photo-taking lens can be mounted on the camera body without damaging or breaking the optical filter. Besides, the arrangement facilitates maintenance work on the optical filter.

Further, according to the arrangement of the embodiment disclosed, the elastic member causes the optical filter to abut on the support member by exerting its resilient force on the side of the second surface of the optical filter located opposite to its first surface which faces the end part of the photo-taking lens in mounting the photo-taking lens. That arrangement ensures that the photo-taking lens can be mounted and demounted without damaging the optical filter, and the optical filter can be promptly set in its predetermined position after the photo-taking lens is mounted.

Further, according to the invention, the optical filter is composed of a low-pass filter or an infrared cut filter. Therefore, the use of the optical filter enables the camera having a solid-state image sensor to take pictures with an excellent picture quality.

What is claimed is:

1. A camera body on which an interchangeable objective lens is mountable, comprising:

a solid-state image sensor disposed in a position where said objective lens forms an image; and an optical filter disposed within said camera body in facing relation with said objective lens, wherein said optical filter is mounted so as to be displaceable, as a result of contact with said objective lens during mounting of said objective lens, away from a position where said objective lens is mountable, and so as to move toward said position where said objective lens is mountable during the releasing of said contact.

2. A camera body according to claim 1, further comprising a mirror arranged between said optical filter and said solid-state image sensor to reflect a light flux coming through said objective lens toward a viewfinder unit.

3. A camera body according to claim 1, wherein said optical filter is an optical low-pass filter.

4. A camera body according to claim 1, wherein said optical filter is an infrared cut filter.

5. A camera body according to claim 1, further comprising a holding member which holds said optical filter, said holding member being fixed to said camera body and being provided with an elastic member for urging said optical filter toward said holding member.

6. A camera body on which an interchangeable objective lens is mountable, comprising:

a solid-state image sensor disposed in a position where said objective lens forms an image; and an optical filter mounted within said camera body so as to be displaceable, as a result of contact with said objective lens in the course of mounting of said objective lens, away from a position where said objective lens is mountable, and so as to move toward said position where said objective lens is mountable during releasing of said contact.

7. A camera body according to claim 6, further comprising a holding member which holds said optical filter, said holding member being fixed to said camera body and supporting said holding member for said displacement by said objective lens.

8. A camera body according to claim 7, wherein said holding member includes an elastic member for returning said optical filter to undisplaced disposition following displacement of said optical filter by said objective lens.

9. A camera body according to claim 6, wherein said displacement of said optical filter is a slanting movement along an optical axis.

10. A camera body comprising:

a mount for an interchangeable objective lens; and an optical filter disposed within said camera body in facing relation with said objective lens mount, wherein said optical filter is mounted so as to be displaceable, as a result of contact with said objective lens during mounting of said objective lens on said objective lens mount, away from said objective lens mount, and so as to move toward said objective lens mount during the releasing of said contact.

11. A camera body comprising:

a mount for an interchangeable objective lens; and
an optical filter mounted within said camera body so as to be displaceable, as a result of contact with said objective lens in the course of mounting of said objective lens on said objective lens mount, and so as to move toward said objective lens mount during release of said contact.

* * * * *